United States Patent [19]
Renfrew

[11] 3,881,866
[45] May 6, 1975

[54] POLYESTER OR POLYACRYLONITRILE FIBERS DYED BY QUATERNIZED OR UNQUATERNIZED AZOANILINO-TOLUENE SULFONAMIDOALKYLENEAMINE

[75] Inventor: Edgar E. Renfrew, Lock Haven, Pa.

[73] Assignee: American Aniline Products, Inc., Paterson, N.J.

[22] Filed: Nov. 3, 1972

[21] Appl. No.: 303,429

[52] U.S. Cl. .................. 8/41 A; 8/41 C; 260/158; 260/205
[51] Int. Cl. .......................... D06p 3/54; D06p 3/76
[58] Field of Search .............. 8/41 A, 41 C; 260/158

[56] References Cited
FOREIGN PATENTS OR APPLICATIONS
1,497,149  10/1967  France ............................ 8/177 AB Primary Examiner—Donald Levy
Attorney, Agent, or Firm—Armstrong, Nikaido & Wegner

[57] ABSTRACT

Basic azo dyes are made by coupling an appropriate diazotized benzenoid or heterocyclic base with an N-dialkylaminoalkylene [α(N-alkylanilino)]m- or p-toluenesulfonamide. Quaternization of the pendant dialkylamino group in the coupler may be carried out before or after coupling if desired to yield quaternary structures. The unquaternized structures, when properly dispersed, are applied to polyesters with excellent substantivity, outstanding fastness to sublimation and good fastness to light. The disperse unquaternized dyes are applied to polyacrylonitrile fabrics from a neutral or acidic bath; the water soluble quaternary structures are especially useful for coloring acrylic fibers.

14 Claims, No Drawings

POLYESTER OR POLYACRYLONITRILE FIBERS DYED BY QUATERNIZED OR UNQUARTERNIZED AZOANILINO-TOLUENE SULFONAMIDOALKYLENEAMINE

BACKGROUND OF THE INVENTION

Since the advent of fibers and textile material containing polyacrylonitrile, there has been considerable research effort toward developing dyes of improved properties for such fibers. Polyacrylonitrile fibers are those containing more than 85% polyacrylonitrile, including the well known commercially available fibers "Orlon," "Acrilan" and "Creslan." Modified acrylics are defined as containing 35 to 84% polyacrylonitrile and include the commercial fibers "Dynel" and "Verel."

It has been proposed to dye acrylic fibers with amine dyes either in the form of their salts in acid solution or their quaternary alkyl ammonium derivatives made by treating a tertiary amino group with a quaternizing agent, such as dimethyl sulfate to form a water-soluble dye which can be applied from aqueous solution. The quaternized dyes according to U.S. Pat. No. 3,480,612 have one or more of the following disadvantages:

1. They exhibit low affinity for acrylic fiber;
2. They produce dyeings of poor fastness to light;
3. They dye acrylic fiber in dull, unattractive shades, or
4. They produce dyeings of poor levelness.

I have discovered certain new basic azo dyes which are not subject to the foregoing disadvantages when quaternized and which in the form of the tertiary amine precursor can be applied to acrylic fibers from acid solution or to aromatic polyester textile material by conventional carrier dyeing methods.

SUMMARY OF THE INVENTION

In accordance with the invention there is provided a dye of the formula:

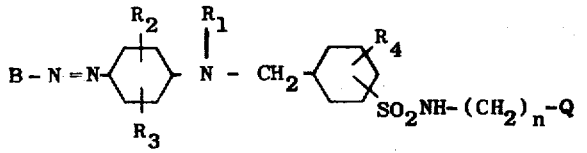

In the above formula, B is a member selected from the group consisting of

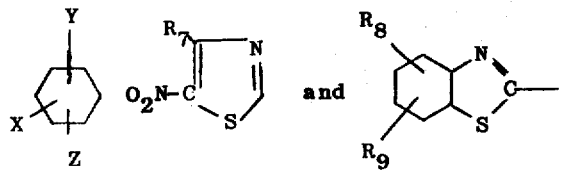

wherein
X, Y and Z are hydrogen, nitro, chlorine, bromine, lower alkoxy, lower alkyl, cyano, sulfamyl, N-(lower alkyl)sulfamyl, N,N-(dilower alkyl)-sulfamyl, lower acylamido, trifluoromethyl, lower alkyl sulfonyl, carbamyl, N-(lower alkyl)carbamyl, and N,N'-(dilower alkyl)carbamyl;
$R_7$ is hydrogen or methyl; and
$R_8$ and $R_9$ are hydrogen, lower alkyl, lower alkoxy, chlorine, bromine, nitro, sulfamyl, N,N-(dilower alkyl)-sulfamyl, cyano, and lower alkyl sulfonyl;

$R_1$ is lower alkyl, cyano lower alkyl, and hydroxy lower alkyl;
$R_2$, $R_3$ and $R_4$ are hydrogen, lower alkyl, lower alkoxy, chlorine and bromine;
n is an integer having a value of 2–4;
Q is a member selected from the group consisting of

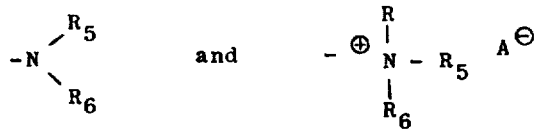

wherein
$R_5$ and $R_6$ are methyl or ethyl;
R is hydrogen, methyl, or ethyl; and
$A^\ominus$ is a water soluble anion.

The dyes of the invention are applied to acrylic fibers and polyester as hereinafter described.

DETAILED DESCRIPTION

The dyes are made in the conventional manner by adding a diazotized aminobenzene or diazotized amino heterocyclic base to a solution of an appropriate coupling component.

Typical aminobenzenes useful as the diazotizable base in the coupling reaction are aniline, o-, m-, or p-phenetidine, o-, m-, or p-aminobenzonitrile, sulfanilamide, metanilamide, N¹-methylsulfanilamide, N¹,N¹-dimethylsulfanilamide, N¹,N¹-dicyanoethylsulfanilamide, N¹,N¹-dimethylmetanilamide, p-aminoacetanilide, 2,4-dichloroaniline, 2,5-dichloroaniline, p-bromoaniline, 2,4-dimethoxyaniline, 2,5-dimethoxyaniline, p-aminomethanesulfonanilide, m- or p-nitroaniline, 4-nitro-o-toluidine, 2-chloro-4-nitroaniline, 3-chloro-4-nitroaniline, 2,6-dichloro-4-nitroaniline, 2-amino-5-nitrobenzonitrile, 2-methylsulfonyl-4-nitroaniline, 4-nitro-o-anisidine, 4-nitro-o-phenetidine, 2,4-dinitroaniline, 6-chloro-2,4-dinitroaniline, 6-bromo-2,4-dinitroaniline, and 2-amino-3,5-dinitrobenzonitrile. Among the foregoing substituted anilines, those bearing, in addition to other substituents, a single nitro group, para or meta to the amine function, are preferred because they provide enhanced light fastness in the final product.

Typical amino heterocycles useful as the diazotizable base in the coupling reaction are 2-amino-5-nitrothiazole, 2-amino-4-methyl-5-nitrothiazole, 2-aminobenzothiazole, 2-amino-6-ethoxybenzothiazole, 2-amino-6-methoxybenzothiazole, 2-amino-6-nitrobenzothiazole, 2-amino-5-methylbenzothiazole, 2-amino-4,6-dichlorobenzothiazole, 2-amino-6-sulfamylbenzothiazole, 2-amino-6-(N,N-dimethylsulfamyl)-benzothiazole, and 2-amino-5-bromobenzothiazole.

The aminobenzene intermediate is diazotized in the usual way by heating it in an aqueous solution of strong mineral acid such as hydrochloric acid, cooling the resulting solution to a temperature of 0°–10°C and adding thereto a quantity of sodium nitrite slightly in excess of the stoichiometric requirement. An alternate method of diazotization involves dissolving sodium nitrite in concentrated sulfuric acid, heating to a temperature of about 60°–70°C, cooling the resulting solution to 0°–10°C and adding thereto the aminobenzene.

A diazonium salt solution of the amino heterocyclic base is prepared by dissolving sodium nitrite in concentrated sulfuric acid, heating to a temperature of about 60°–70°C, cooling the resulting solution to about 0°C and adding thereto first a mixture of acetic and propionic acid and thereafter the amino heterocyclic base. Alternatively, the amino heterocyclic base can be mixed with concentrated phosphoric acid, stirred to solution at temperatures up to 65°C, and cooled to below 0°C. To the cold solution sodium nitrite and water are added dropwise with stirring.

Couplers useful in preparing the dyes are made by chlorosulfonation of an N-alkyl-N-phenylbenzylamine followed by reaction with an N,N-dialkylalkylenediamine having from 2–4 carbon atoms in the alkylene chain. Amine bases which are suitable for the chlorosulfonation reaction are made by the reaction between an N-alkylaniline and a benzyl halide. Particularly useful sulfonyl chloride intermediates include α-(N-methylanilino)-m-toluenesulfonyl chloride, α-(N-ethylanilino-m-toluenesulfonyl chloride, α-(N-cyanoethylanilino)-m-toluenesulfonyl chloride, α-(N-methyl-m-toluino)-m-toluenesulfonyl chloride, α-(N-ethyl-o-chloroanilino)-m-toluenesulfonyl chloride, α-(N-ethylanilino)-m-(6-chlorotoluenesulfonyl chloride, α-N-methylaniline)-m-(4-methoxytoluene)sulfonyl chloride, α-(N-butylanilino)-m-toluenesulfonyl chloride and α-(N-hydroxyethylanilino)-m-toluenesulfonyl chloride.

The sulfonyl chloride of the amine base is converted to the sulfonamide by treating it with a substantially stoichiometric quantity of the N,N-dilower alkylalkanediamine under conventional acid accepting conditions. The reaction can be run in aqueous solution or in the presence of excess diamine or in an inert organic solvent at a temperature of 60°–100°C. A small amount of an acid acceptor such as sodium acetate may be useful to promote the reaction.

The structure of these and other useful couplers are thus:

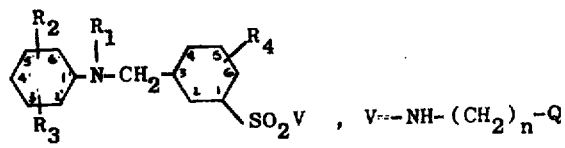

wherein the substituents of the formula are as defined aforesaid. The 4'-position is unsubstituted since it must be available as a coupling site to be useful. The position of the sulfamyl group has been assigned by analogy with the sulfonic acid studies of Blanguy, L, H. E. Fierz-David, G. Stamm, Helv. Chim. Acta. 25 1162 (1942) in which similar N-alkyl-N-arylbenzyl amines were sulfonated, yielding mainly the substituted m-toluenesulfonic acid, V=OH. However, other products were isolated and must represent other positions of the entering sulfo group. Thus, it is highly presumptive that chlorosulfonation behaves similarly, and certain amounts of sulfonamides of the structure are formed. They are useful couplers if the sulfonamide group is in the benzyl moiety.

The azo dyes of the invention are made by the reaction of the diazotized base with the coupler by adding the diazonium salt to a cold aqueous solution of the coupler. A buffering agent, such as sodium acetate is added to reduce the acidity to a pH of 5 to 7. The mixture is allowed to react for 8–24 hours at room temperature and is thereafter filtered and washed acid fee.

The desired azo product is thus obtained in the form of a wet cake.

The quaternary alkyl ammonium dyes of the invention are prepared by quaternizing azo dye obtained from the coupling reaction with an alkylating agent, or by coupling the diazotized amine with the coupling component as described above after the coupling component has been quaternized. The novel dyes in their unquaternized form are converted to the corresponding quaternary alkyl ammonium derivatives by treatment with conventional alkylating agents.

The quaternary ammonium derivatives of the coupling components and azo dyes of the invention are prepared by known alkylation procedures, i.e., by reaction of the amino group and an alkylating agent such as dimethyl sulfate; a lower alkyl chloride, bromide or iodide, benzyl chloride; methyl p-toluene sulfonate and the like. The quaternization reaction is advantageously done in an inert organic diluent such as, o-dichlorobenzene, in order to obtain a fluid reaction medium.

The anion $A^-$ in the quaternary compound is an organic or inorganic water soluble ion, including $Cl^-$, $Br^-$, $I^-$, $HSO_4^-$, $H_2PO_4^-$, $ZnCl_3^-$, $CH_3SO^-$, $C_2H_5SO_3^-$, $C_6H_5SO_3^-$, $HCOO^-$, $CH_3COO^-$, $C_6H_5COO^-$, and the oxalate, tartrate and citrate ion.

The anion $A^-$ may be introduced by the alkylating agent, eg., dimethyl sulfate (providing methosulfate anion) or the anion may be introduced in salting out the quaternary compound from the quaternization reaction mass for example by addition of zinc chloride (providing the trichlorozincate anion).

The quaternary dyes of the invention have excellent affinity for acrylic fiber (either alone or in blends with other textile fibers) and dye it in attractive level shades fast to light, washing and sublimation. The new quaternary dyes, being water soluble, are applied to acrylic fiber from aqueous solution preferably at the boil. Preferably the new dyes are applied from mildly acidic aqueous dyebaths of pH ca. 3 to 6. This is done either by setting the bath at the start with a suitable acid such as acetic, formic, tartaric, sulphuric or naphthalenesulphonic acid, alkali bisulphate or an acid alkali phosphate, or by adding an agent to the bath which produces acid during the dyeing process. Examples of such agents are the salts of volatile bases of strong nonvolatile acids, such as ammonium sulfate, and the water soluble esters of organic acids which saponify during dyeing, such as the methyl or ethyl esters of aliphatic oxy acids, e.g., lactic, malic and tartaric acids. If the dyes are applied in mineral acid solution, the mineral acid also can be neutralized during dyeing by the gradual addition of alkaline salts of weaker acids, e.g., sodium acetate. The dyes are applicable with heating in open baths and in enclosed machines at temperatures above 100°C. under pressure.

The unquaternized azo dyes of the invention are water-insoluble dyes for synthetic hydrophobic fibers such as polyethylene terephthalate (Dacron), cellulose acetate and super-polyamide fiber for example polyhexamethylene adipamide (nylon 66). The unquaternized azo dyes, being water insoluble, are applied according to the well known disperse dyeing technique wherein the color is applied to the fiber from an aqueous dispersion of the dyestuff with the aid of a dispersing agent e.g., sodium lignosulfonate. Disperse pastes and powders are prepared as described in U.S. Pat. No. 3,685,952 of Edgar E. Renfrew.

To dye aromatic polyester textile material, the dye, when added to water with or without auxiliary agents, forms a near colloidal aqueous dispersion from which the textile material is dyed in the conventional manner at 40°–100°C (104°–212°F) to give a colored fiber containing about 0.01–2 percent by weight dye (100% color basis).

The unquaternized azo dyes of the invention also dye acrylic fibers from a disperse bath. When applied to polyacrylonitrile from an acid bath, the amine salt of the acid is formed and the polyacryonitrile is dyed in bright shades having excellent fastness to light and wet processing.

My invention is further illustrated by the following examples.

EXAMPLE 1

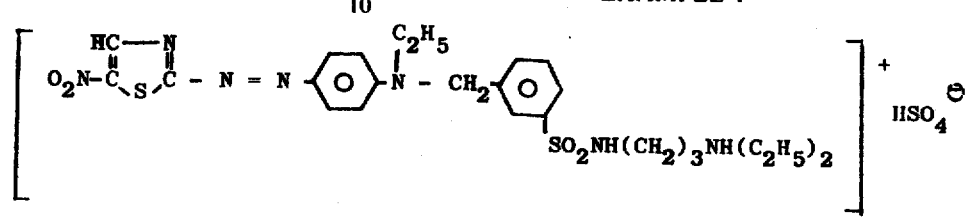

A. Diazonium Solution

| | | |
|---|---|---|
| | | In a suitable vessel equipped with a stirrer, a heater and thermometer were charged: |
| 153 | parts | sulfuric acid (93–94%). To this were added |
| 12.4 | parts | sodium nitrite below 15°C. The mixture was heated to 65°C, and then cooled to 0°C, at which temperature |
| 140 | parts | glacial acetic acid and |
| 24 | parts | propionic acid was added below 3°C, followed by |
| 25.2 | parts | 2-amino-5-nitrothiazole. |
| | | The diazotization mixture was stirred for 2½ hours at −2° to +6°C. |

B. Coupler Solution

| | | |
|---|---|---|
| | | A mixture of |
| 75 | parts | N-(3-diethylamino-n-propyl)-α-(N-ethylanilino)-m-toluenesulfonamide in |
| 1000 | parts | water containing |
| 48 | parts | hydrochloric acid (32%) was stirred to solution at 65°C. It was allowed to cool to 30°C, at which temperature enough ice was added to lower the temperature to 2°C. |

C. Coupling

| | | |
|---|---|---|
| | | To the cold solution B was added the cold solution A. Stirring was continued for 2½ hours after which time |
| 375 | parts | sodium chloride were added and the stirring continued for 17 hours during which time the temperature was allowed to rise to that of the surroundings. The azo product was isolated by filtration. It was washed with sodium chloride solution (13%) on the filter until the washings were no longer acidic. The cake was dried at 80°C. It weighed 59 parts, representing a yield of 59%. |

D. Standardization

| | | |
|---|---|---|
| | | To a ballmill were charged |
| 58 | parts | azo product from C |
| 58 | parts | sodium sulfate. The charge was ballmilled 16 hours. |

E. Dyeing

| | | |
|---|---|---|
| | | To a water bath at 50°C was added |
| 0.3 | cc | of 10% sodium acetate |
| 0.1 | cc | of 56% acetic acid and |
| 1 | cc | of dyeing assistant. To the bath was added the standardized dyestuff in an amount sufficient to provide a dyeing in the range of 0.5–2% on weight fiber. The total volume of the bath thus prepared was 250 cc. |
| 10 | g. | of "Acrilan" polyacrylnitrile skein was introduced to the bath and turned throughout dyeing. The temperature was raised slowly to 205°F and after 20 minutes |
| 0.1 | cc | of 56% acetic acid was added. The skein was added for 60 minutes on a boiling water bath and the pot was thereafter cooled to 70°C. The skein was removed, rinsed in lukewarm water and dried. The dyed product had a violet shade of good strength and lightfastness. |

EXAMPLE 2

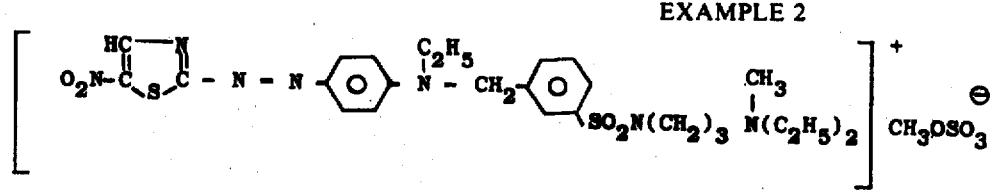

A. Diazotization

| | | |
|---|---|---|
| 127 | parts | sulfuric acid (93–94%). Below 15°C |
| 10.3 | parts | sodium nitrite were added. The mixture was warmed to 65°C and then cooled to 0°C. At this temperature, a solution made up from |
| 116 | parts | galcial acetic acid |
| 20 | parts | propionic acid was added at 0° to 3°C, and this was followed by the addition of |
| 22 | parts | 2-amino-5-nitrothiazole. The diazotization mixture was stirred for 2½ hours at 0° to 6°C. |

To a suitable vessele was charged

B. Coupler

In a suitable vessel was dissolved by stirring at 60°–65°C.

| | | |
|---|---|---|
| 77 | parts | {diethyl 3-[α-(N-ethylanilino)-m-toluenesulfonamido]-n-propyl} methylammonium methyl sulfate (prepared by treating N-(3-diethylamino-n-propyl)-(N-ethylanilino)-m-toluenesulfonamide with dimethyl-sulfate in chlorobenzene dispersed in |
| 500 | parts | water. The solution was cooled externally to 25°C and then to 0°C by adding ice. |

C. Coupling

The solution from part A was added to the solution of part B. The addition was made at 0° to 3°C. Stirring was continued for twelve hours during which the temperature was allowed to rise to that of the room.
The azo product was collected on a filter and sucked dry. The presscake was then dissolved at 80°–90°C in

| | | |
|---|---|---|
| 2000 | ml | water, and the solution was clarified through a filter coated with a diatomaceous earth filter aid, and washed through the filter with hot water. To the combined filtrates there was added at 65°C |
| 112.5 | parts | sodium chloride. The mixture was stirred for 17 hours. The azo product was collected on a filter and was washed with |
| 1750 | parts | 10% sodium chloride solution until the washings were no longer acidic. The azo product was dried. It weighed 66.5 parts, containing 6.25 parts salt indicating a yield of 67.5%. |

D. Standardization

To a suitable mill was charged

| | | |
|---|---|---|
| 30 | parts | azo product from part C and |
| 30 | parts | anhydrous sodium sulfate. The charge was milled 16 hours. The product dyed polyacrilonitrile ("Acrilan") from 0.2% and 0.4% solution in violet shades of good strength and lightfastness. |

EXAMPLE 3

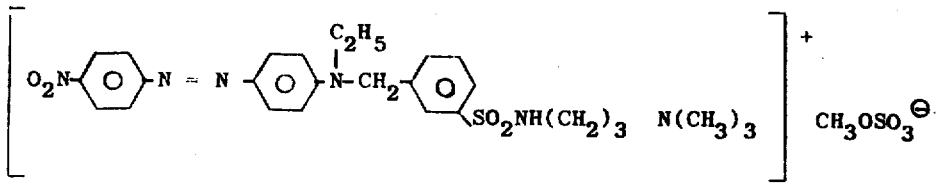

A. Diazonium Solution

In a suitable vessel equipped with a stirrer, a heater and thermometer were charged:

| | | |
|---|---|---|
| 20.7 | parts | p-nitroaniline |
| 45 | parts | hydrochloric acid, 32%, and |
| 45 | parts | water. |

The mixture was stirred at 80°C until solution resulted. The solution was poured into a mixture of

| | | |
|---|---|---|
| 120 | parts | ice and |
| 120 | parts | water. |

While maintaining the temperature at 0°C by the addition of ice as needed, there was added

| | | |
|---|---|---|
| 10.5 | parts | sodium nitrite in |
| 30 | parts | water. |

The diazotization mixture was stirred for one hour at 0° to 5°C. Excess nitrous acid was then destroyed by the addition of small portions of sulfamic acid. The diazotization solution was clarified by passing through a bed of diatomaceous earth on a filter. The filter was washed with a small portion of ice water and the washings collected with the filtrate to make 750 parts by volume.

B. Coupler

In a suitable flask fitted with stirrer, dropping funnel and drying tube was placed

| | | |
|---|---|---|
| 441 | parts | chlorosulfonic acid. Then were added |
| 105.6 | parts | N-ethyl-N-phenylbenzylamine below 25°C, maintained |

—Continued

| | | |
|---|---|---|
| | | by external cooling. The temperature was raised to 50°C and held at this temperature for 5½ hours. The mixture was then cooled to 25°C and added slowly to a mixture of ice, |
| 750 | parts | chlorobenzene and |
| 250 | parts | water, adding enough ice to keep the temperature below 2°C. The chlorobenzene layer was allowed to settle, the aqueous phase was drained off, and the chlorobenzene washed several times by decantation with ice water and then mixed with |
| 1000 | parts | ice water. To this was added with vigorous stirring at 2°–4°C, a solution of |
| 76 | parts | N,N-dimethyl-1,3-propanediamine |
| 30 | parts | sodium carbonate |
| 500 | parts | water and |
| 5 | parts | "Tween 20" (a commercially available surface active material) adding ice as needed. The slurry was stirred 16 hours during which period the temperature was allowed to rise to that of the room. The chlorobenzene was drawn off, washed with two portions, each |
| 300 | parts | water, and charged to a suitable flask which was fitted with a stirrer, thermometer and inversed Dean-Starke trap. After removing residual water by raising the temperature to 137°C, |
| 89 | parts | dimethyl sulfate were added at 100°C and the quaternization was completed by stirring for six hours at 100°C. The quaternary product separated as a heavy oil, which was isolated by decantation. It was washed with chlorobenzene at 90°–95°C. After steam distillation of residual amounts of solvent, a clear aqueous solution of the quaternary salt was obtained which was diluted with water to |
| 900 | parts | by volume to make a 14.1% solution by volume. It was analyzed by titration with diazotized p-nitro-aniline and was found to contain 127 parts trimethylammonium salt or 49% of theory. |
| 280 | parts | of above 14% solution were mixed with |
| 750 | parts | water, and |
| 62 | parts | by volume sodium acetate solution (20% by volume) and cooled to 2°C. (Coupling solution B) |

C. Coupling

| | | |
|---|---|---|
| 385 | parts | by volume of ice cold diazonium salt solution A were added slowly at 2°C to coupling solution B and stirred for one hour. To this |
| 75 | parts | sodium chloride were added and the mixture stirred for 17 hours, during which time the temperature rose to 20°–25°C. It was then heated to 80°C and |
| 100 | parts | salt were added. The mixture was stirred for one hour at 80°C. The azo product was collected by filtration on hard filterpaper and the presscake washed with sodium chloride solution (10%) and dried. Obtained was |
| 47.3 | parts | azo product, containing 4.2 parts sodium chloride or 98% yield. |

D. Dispersion

| | | |
|---|---|---|
| 47.3 | parts | azo product C and |
| 47.3 | parts | anhydrous sodium sulfate were placed in to ballmill and milled for 24 hours. The product dyed polyacrilonitrile fabric ("Acrilan") from 0.4 and 0.8% solution in red orange shades of very good properties. |

EXAMPLE 4

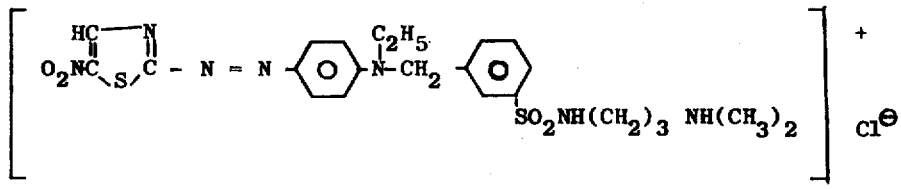

A. Diazotization

| | | |
|---|---|---|
| 23 | parts | 2-amino-5-nitrothiazole were diazotized as described in Example 1. |

B. Coupler (14.1% solution)

| | | |
|---|---|---|
| 550 | parts | by volume of trimethylammonium salt solution as described in Example 3 was diluted with |
| 1000 | parts | water and cooled to 0°C by the addition of ice. |

―Continued

C. Coupling

|  |  |  |
|---|---|---|
|  |  | The diazonium solution A was added to 0°C to coupler B, adding ice as necessary. The mixture was stirred for five hours allowing the temperature to rise to 20°-25°C. |
| 125 | parts | sodium chloride were added, the the azo product was collected on a filter after twelve hours stirring. The presscake was dissolved in |
| 1000 | parts | water at 85°C, the solution clarified and the filter washed with hot water. The washings were combined with the filtrate and the azo product precipitated by adding at 85°C |
| 125 | parts | sodium chloride. The product was collected by filtration at 40°C, and the presscake washed free from inorganic acids with 10% salt solution. Obtained were 67.5 parts azo product, containing 8.1 parts sodium chloride, equivalent to 68% yield. |

D. Standardization

|  |  |  |
|---|---|---|
|  |  | A ballmill was charged with |
| 67.5 | parts | azo dye C, and |
| 67.5 | parts | anhydrous sodium sulfate and the contents were milled for 24 hours. It dyed "Acrilan" from 0.5 and 1% solutions in reddish blue shades of good strength and lightfastness. |

EXAMPLE 5

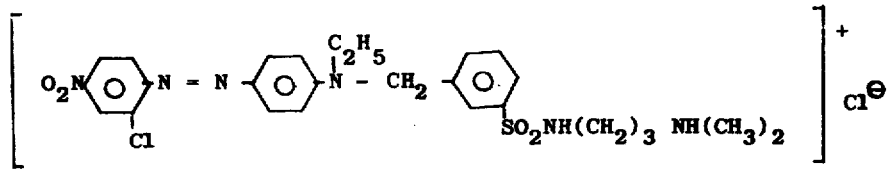

A. Diazotization

|  |  |  |
|---|---|---|
|  |  | A suitable flask was charged with |
| 34.5 | parts | 2-chloro-4-nitroaniline |
| 80 | parts | hydrochloric acid, 32%, |
| 80 | parts | water and |
| 5 | parts | "Tween 20", and stirred for 10 minutes at 80°C. The mixture was poured into a mixture of |
| 200 | parts | ice and |
| 100 | parts | water While maintaining the temperature at 0°C by the addition of ice, there was added |
| 14.2 | parts | sodium nitrite in |
| 40 | parts | water. The diazotization mixture was stirred for one hour below 5°C. Excess nitrous acid was then destroyed by the addition of small amounts of sulfamic acid. The diazotization solution was clarified by passing it through a bed of diatomaceous earth on a filter, the washings combined with the filtrate to make 700 parts by volume. |

B. Coupler

|  |  |  |
|---|---|---|
|  |  | N(3-dimethylamino-n-propyl)-α-(N-ethylanilino)-m-toluenesulfonamide was prepared by treating |
| 105.6 | parts | N-ethyl-N-phenylbenzylamine with chlorosulfonic acid and further treating the sulfonyl chloride thus formed with |
| 76 | parts | N,N-dimethyl-1,3-propanediamine as described in Example 3. Chlorobenzene was removed by steam distillation and the oily residue (184 parts) was dissolved in enough water containing |
| 97 | parts | hydrochloric acid 32% to make 600 parts by volume. |

C. Coupling

|  |  |  |
|---|---|---|
| 289 | parts | (volume) coupler B were diluted with |
| 750 | parts | water and enough ice added to lower the temperature to 0°C. |
| 700 | parts | cold solution A were added simultaneously with sodium acetate solution (20% vol.) to keep the mixture slightly acid to Congo Red test papers. The coupling mixture was stirred for 17 hours during which time the temperature was allowed to rise to that of the surroundings. |
| 525 | parts | sodium chloride were added and the temperature was raised to 68°C. The azo product was stirred for 48 hours. It was collected by filtration, and the presscake slurried in |
| 2000 | parts | water |
| 300 | parts | sodium chloride were added at 25°C, the mixture heated to 50°C, the azo product collected on a hard filter and dried. Obtained were 137 parts of azo product containing 7.2 parts sodium chloride. |

—Continued

D. Quaternization

|  |  |  |
|---|---|---|
|  |  | A suitable flask, fitted with stirrer, thermometer, and water trap with condenser, was charged with |
| 68.5 | parts | azo product C and |
| 390 | parts | chlorobenzene. The mixture was heated to 137°C to remove residual water and cooled to 100°C. |
| 18.3 | parts | dimethyl sulfate diluted with |
| 31.7 | parts | chlorobenzene were added during two hours and the stirring continued for 3½ hours at this temperature. The charge was poured at 84°C into |
| 500 | parts | water at 50°C and the flask rinsed with |
| 385 | parts | hot water, and the rinse combined with chlorobenzene/water mixture. After 17 hours stirring, the chlorobenzene was drawn off and washed several times with water. The aqueous layer was combined with the washings and heated to 40°C. |
| 262 | parts | sodium chloride were added, the charge was cooled to 12°C, and the quaternized dye was collected by filtration. The presscake was washed with 15% sodium chloride solution and dried. Obtained was 68 parts of product as a tacky mass, easily soluble in water. |

E. Standardization

| 68 | parts | azo product were mixed with |
| 68 | parts | sodium sulfate. It dyed "Acrilan" from 1 and 2% solutions in red shades of good strength and lightfastness (3). |

EXAMPLE 6

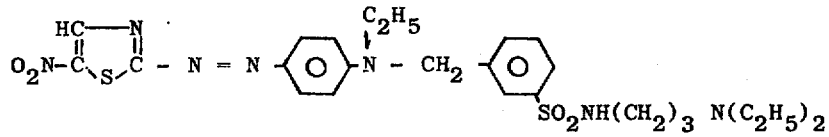

A. Diazotization

| 31.8 | parts | 2-amino-5-nitrothiazole, equivalent to 0.22 mole, were diazotized as described in Example 1. |

B. Coupler

| 285 | parts | by volume of an acidic solution of N(3-diethylamino-n-propyl)-α-(N-ethylaminino)-m-toluenesulfonamide equivalent to 0.25 mole prepared in the manner as described in Example 1, |
| 715 | parts | water, and |
| 150 | parts | salt were charged to a suitable vessel and cooled to 0°C. |

C. Coupling

|  |  | Solution A was added to B at 0–5°C adding ice as needed. The azo product separated in a tarry form which became frangible on warming to 30°C. The mixture was stirred for 17 hours. The azo product was collected by filtration. The presscake was dissolved at 65°C in |
| 1000 | parts | water at 65°C, and reprecipitated at 42°C by adding |
| 38 | parts | sodium carbonate solution (20% by volume). The azo product was collected by filtration, washed free from alkali. Obtained was 260 parts presscake equivalent to 69.5 parts azo product or 57% yield. |

D. Dispersion

|  |  | A suitable mill was charged with |
| 224 | parts | azo product C |
| 58 | parts | "Lignosol FTA" (a commercially available ligninsulfonic acid material offered as a dispersing agent) and |
| 108 | parts | water. The charge was milled for 12 hours to make a 15% paste. Dyed on "Acrilan" from 1 and 2% solution in bright reddish blue shades and good strength and lightfastness (20 hours+ 3). Sublimation 5, washfastness 3. Dyed polyester from 2 and 4% solution in red-violet shades. Sublimation +5, +5. Light, 20 hrs. −3. |

EXAMPLES 7-62

By following the procedures of the preceding examples, the following dyes, providing dyeings of the indicated hue, are produced.

The terms "B", "Q" and "A" correspond to the formula set forth in the "Summary of Invention." In cases where no "A" term is indicated either quaternization has not been carried out or the pH used is not acidic enough to ionize the "Q."

| Example | B | $R_1$ | $R_2$ | $R_3$ | $R_4$ | n | Q | A | Hue |
|---|---|---|---|---|---|---|---|---|---|
| 7 | $O_2N-\phi-$ | $-CH_3$ | $(2'-)OC_2H_5$ | H | H | 3 | $N(CH_3)_2$ | - | Yellowish Red |
| 8 | $\phi-CONH-\phi-$ | $C_2H_5$ | H | H | H | 3 | $N(CH_3)_2$ | - | orange |
| 9 | $\phi(NO_2)-$ | $C_2H_5$ | H | H | H | 3 | $N(CH_3)_2$ | - | Bright orange |
| 10 | $H_3CO_2S-\phi-$ | $C_2H_5$ | H | H | H | 3 | $N(CH_3)_2$ | - | Bright orange |
| 11 | $O_2N-\phi(CH_3)-$ | $C_2H_5$ | H | H | H | 3 | $N(CH_3)_2$ | - | Yellowish Scarlet |
| 12 | $O_2N-\phi(Br)-$ | $C_2H_5$ | $(3'-)CH_3$ | H | H | 3 | $N(CH_3)_2$ | - | Bluish Red |
| 13 | $\phi(CN)(CN)-$ | $C_2H_5$ | $(3'-)CH_3$ | H | H | 3 | $N(CH_3)_2$ | - | Scarlet |
| 14 | $H_2NO_2S-\phi-$ | $CH_3$ | H | H | H | 3 | $NH(CH_3)_2^{\oplus}$ | $Cl^{\ominus}$ | Yellowish orange |
| 15 | $H_3CSO_2NH-\phi-$ | $CH_3$ | H | H | H | 3 | $NH(CH_3)_2^{\oplus}$ | $Cl^{\ominus}$ | Yellowish orange |
| 16 | $O_2N-\phi(OCH_3)-$ | $C_2H_5$ | H | H | H | 2 | $NH(CH_3)_2^{\oplus}$ | $Cl^{\ominus}$ | Red |
| 17 | $\phi(Cl)-$ | $CH_2CH_2CN$ | H | H | H | 3 | $N(CH_3)_3^{\oplus}$ | $CH_3OSO_3^{\ominus}$ | Orange |
| 18 | $H_3CCONH-\phi-$ | $C_2H_5$ | $(3'-)CH_3$ | H | H | 2 | $N(CH_3)_3^{\oplus}$ | $CH_3OSO_3^{\ominus}$ | Red |
| 19 | $NC-\phi-$ | $C_2H_5$ | $(3')-CH_3$ | H | H | 3 | $N(C_2H_5)_2$ | - | Red |

-- Continued

| Example | B | R₁ | R₂ | R₃ | R₄ | n | Q | A | Hue |
|---|---|---|---|---|---|---|---|---|---|
| 20 | H₂NO₂S—⟨⟩ | CH₂CH₂CN | H | H | H | 3 | N(C₂H₅)₂ | — | Orange |
| 21 | H₃CHNO₂S—⟨⟩ | CH₂CH₂CN | H | H | H | 3 | N(C₂H₅)₂ | — | Orange |
| 22 | (CH₃)(CH₃)NO₂S—⟨⟩—Cl | CH₃ | H | H | H | 3 | N(CH₃)₃⁺ | CH₃OSO₃⁻ | Orange |
| 23 | NC—⟨⟩ | C₂H₅ | (3')-OCH₃ | H | H | 3 | N(CH₃)₃⁺ | CH₃OSO₃⁻ | Red |
| 24 | O₂N—⟨⟩—Cl | N-C₃H₇ | H | H | H | 3 | N(CH₃)(C₂H₅)₂⁺ | CH₃OSO₃⁻ | Red |
| 25 | O₂N—⟨⟩ | C₂H₅ | (2')-Cl | (5')-Cl | H | 2 |  |  | Red |
| 26 | O₂N—⟨⟩ | C₂H₅ | H | H | H | 2 |  |  | Red Orange |
| 27 | O₂N—⟨⟩—CH₃ | C₂H₅ | (3')-CH₃ | H | H | 3 | CH₃—N⁺-(C₂H₅)₂ | CH₃OSO₃⁻ | Bluish Red |

| Example | B | R₁ | R₂ | R₃ | R₄ | n | Q | A | Hue |
|---|---|---|---|---|---|---|---|---|---|
| 28 | O₂N—⟨⟩ | CH₃ | H | H | H | 3 | CH₃—N⁺-(C₂H₅)₂ | CH₃OSO₃⁻ | Red-Orange |
| 29 | O₂N—⟨⟩—Cl | C₂H₅ | (3')-CH₃ | H | H | 3 | CH₃—N⁺-(C₂H₅)₂ | CH₃OSO₃⁻ | Rubine |
| 30 | O₂N—⟨⟩ | CH₃ | (2')-CH₃ | (5')-CH₃ | H | 3 | NH-(C₂H₅)₂⁺ | Cl⁻ | Red |
| 31 | O₂N—⟨⟩—Cl | CH₃ | (2')-CH₃ | (3')-CH₃ | H | 3 | NH-(C₂H₅)₂⁺ | HOSO₃⁻ | Red |
| 32 | O₂N—⟨⟩ | C₂H₅ | (3')-Cl | H | H | 3 | NH-(CH₃)₂⁺ | H₂PO₃⁻ | Yellow Red |
| 33 | O₂N—⟨⟩—CH₃ | CH₃ | (2')-Br | H | H | 3 | NH-(CH₃)₂⁺ | ClO₃⁻ | Rubine |
| 34 | O₂N—⟨⟩ | C₂H₅ | (2')-CH₃ | (5')-CH₃ | H | 3 | NH-(CH₃)₂⁺ | Br⁻ | Red |

—Continued

| Example | B | $R_1$ | $R_2$ | $R_3$ | $R_4$ | n | Q | A | Hue |
|---|---|---|---|---|---|---|---|---|---|
| 35 | $O_2N$-⟨⟩-Cl, Cl | $n\text{-}C_4H_9$ | H | H | H | 3 | $N(C_2H_5)_3^{\oplus}$ | $C_2H_5OSO_3^{\ominus}$ | Orange Brown |
| 36 | $O_2N$-⟨⟩-Cl | $-CH(CH_3)_2$ | H | H | H | 2 | $N(CH_3)_2$ | - | Red |
| 37 | $O_2N$-⟨⟩ | $C_2H_5$ | H | H | H | 2 | $N(CH_3)_2$ | - | Reddish Orange |
| 38 | $O_2N$-⟨⟩ | $C_2H_5$ | H | H | (5)Cl | 2 | $N(C_2H_5)_2$ | - | Reddish Orange |
| 39 | $O_2N$-⟨⟩ | $C_2H_5$ | (3')$CH_3$ | H | (5)$OCH_3$ | 3 | $N(C_2H_5)_2$ | - | Red |
| 40 | $O_2N$-⟨⟩-Cl | $C_2H_5$ | H | H | (5)$CH_3$ | 3 | $N(C_2H_5)_2$ | - | Red |
| 41 | $O_2N$-⟨⟩-$CH_3$ | $C_2H_5$ | (3')$CH_3$ | H | (4)Cl | 3 | $N(C_2H_5)_2$ | - | Bluish Rubine |

| Example | B | $R_1$ | $R_2$ | $R_3$ | $R_4$ | n | Q | A | Hue |
|---|---|---|---|---|---|---|---|---|---|
| 42 | $O_2N$-⟨⟩-CN | $C_2H_5$ | H | H | (6)$CH_3$ | 3 | $N(C_2H_5)_2$ | - | Rubine |
| 43 | $O_2N$-⟨⟩-Br, $NO_2$ | $C_2H_5$ | H | H | H | 3 | $N(CH_3)_3^{\oplus}$ | $CH_3OSO_3^{\ominus}$ | Violet |
| 44 | $CH_3, NO_2S$-⟨⟩-$CH_3$ | $C_2H_5$ | (3')-$OCH_3$ | H | H | 3 | $N(CH_3)_3^{\oplus}$ | $CH_3OSO_3^{\ominus}$ | Reddish Orange |
| 45 | $O_2N$-⟨⟩ | $-CH_2CH_2OH$ | H | H | H | 3 | $N(CH_3)_3^{\oplus}$ | $CH_3OSO_3^{\ominus}$ | Reddish Orange |
| 46 | $O_2N$-⟨⟩-Cl | $C_2H_5$ | H | H | H | 3 | $\overset{CH_3}{\underset{N(C_2H_5)_2}{|}}^{\oplus}$ | $CH_3OSO_3^{\ominus}$ | Red |
| 47 | $O_2N$-⟨⟩-Cl | $C_2H_5$ | (2')-$OCH_3$ | (5')$OCH_3$ | H | 3 | $\overset{CH_3}{\underset{N-(C_2H_5)_2}{|}}^{\oplus}$ | $CH_3OSO_3^{\ominus}$ | Plum |
| 48 | $H_5C_2O$-⟨⟩-N=C-S | $C_2H_5$ | (3')-$CH_3$ | H | H | 3 | $N-(CH_3)_2$ | - | Scarlet |

| Example | B | $R_1$ | $R_2$ | $R_3$ | $R_4$ | n | Q | A | Hue |
|---|---|---|---|---|---|---|---|---|---|
| 49 | (Cl-benzothiazole) | $C_2H_5$ | H | H | H | 3 | $N-(CH_3)_2$ | — | Scarlet |
| 50 | (benzothiazole) | $C_2H_5$ | H | H | H | 3 | $N-(CH_3)_2$ | — | Reddish Orange |
| 51 | ($O_2N$-benzothiazole) | $CH_3$ | (3'-)$CH_3$ | H | H | 3 | $N-(C_2H_5)_2$ | — | Bluish Red |
| 52 | ($H_3CO_2$-benzothiazole) | $CH_3$ | H | H | H | 3 | $\overset{CH_3}{\underset{N-(C_2H_5)_2}{}}^{\oplus}$ | $CH_3OSO_3^{\ominus}$ | Scarlet |
| 53 | ($CH_3$-benzothiazole) | $CH_2CH_2CN$ | H | H | H | 3 | $N-(CH_3)_3^{\oplus}$ | $CH_3OSO_3^{\ominus}$ | Scarlet |
| 54 | (Cl-benzothiazole) | $CH_2CH_2CN$ | H | H | H | 3 | $N-(CH_3)_3^{\oplus}$ | $CH_3OSO_3^{\ominus}$ | Reddish Orange |
| 55 | (Br-benzothiazole) | $C_2H_5$ | (3')-$CH_3$ | H | H | 3 | $N-(CH_3)_3^{\oplus}$ | $CH_3OSO_3^{\ominus}$ | Reddish Orange |

| Example | B | $R_1$ | $R_2$ | $R_3$ | $R_4$ | n | Q | A | Hue |
|---|---|---|---|---|---|---|---|---|---|
| 56 | ($OCH_3$, $H_3C$-benzothiazole) | $C_2H_5$ | H | H | H | 3 | $NH(CH_3)_2^{\oplus}$ | $Cl^{\ominus}$ | Red |
| 57 | ($NO_2$, $O_2N$-benzothiazole) | $C_2H_5$ | H | H | H | 3 | $NH(C_2H_5)_2^{\oplus}$ | $Cl^{\ominus}$ | Rubine |
| 58 | (Cl, Cl-benzothiazole) | $C_2H_5$ | H | H | H | 3 | $NH(CH_3)_2$ | $HSO_3^{\ominus}$ | Red |
| 59 | ($H_2NO_2S$-benzothiazole) | $C_2H_5$ | H | H | H | 3 | $N(CH_3)_2$ | — | Scarlet |
| 60 | (NC-benzothiazole) | $C_2H_5$ | H | H | H | 3 | $N(CH_3)_3^{\oplus}$ | $CH_3OSO_3^{\ominus}$ | Red |
| 61 | ($H_3C$, $H_3C$, $NO_2S$-benzothiazole) | $C_2H_5$ | H | H | H | 3 | $N(CH_3)_3^{\oplus}$ | $CH_3OSO_3^{\ominus}$ | Scarlet |
| 62 | ($H_3CO-C$, $O_2N$-thiazole) | $C_2H_5$ | H | H | H | 3 | $N(CH_3)_3^{\oplus}$ | $CH_3OSO_3^{\ominus}$ | Reddish blue |

I claim:
1. A polyester textile material dyed with a compound of the formula:

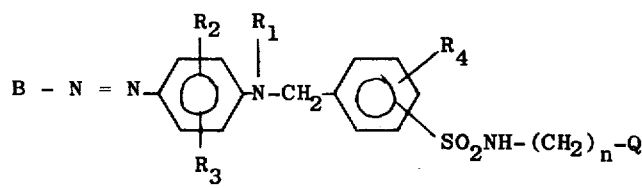

in which:

B is a member selected from the group consisting of

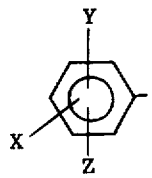  and 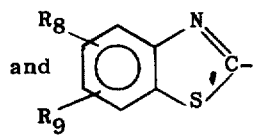

wherein

| | |
|---|---|
| X, Y, and Z are | members selected from the group consisting of hydrogen, nitro, chlorine, bromine, lower alkoxy, lower alkyl, cyano, sulfamyl, N-(lower alkyl)-sulfamyl, N,N-(dilower alkyl)-sulfamyl, lower acrylamido, trifluoromethyl, lower alkyl sulfonyl, carbamyl, N-(lower alkyl)carbamyl and N,N-(dilower alkyl) carbamyl; hydrogen or methyl; and |
| $R_1$ is | alkoxy, chlorine, bromine, nitro, sulfamyl, N,N-(dilower alkyl)sulfamyl, cyano and lower alkyl sulfonyl; lower alkyl, cyano lower alkyl, and hydroxy lower alkyl; |
| $R_2$, $R_3$ and $R_4$ are | hydrogen, lower alkyl, lower alkoxy, chlorine and bromine; |
| n is | an integer having a value of 2–4; |
| Q is | a member selected from the group consisting of |

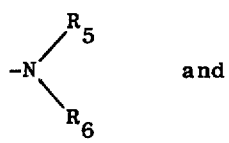 and 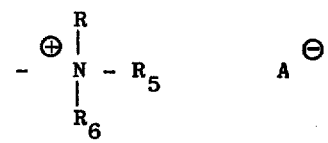

| | |
|---|---|
| $R_5$ and $R_6$ are | methyl or ethyl; |
| R is | hydrogen, methyl, or ethyl; and |
| $A^\ominus$ is | a water soluble anion. |

| | |
|---|---|
| $R_7$ is | hydrogen or methyl; and |
| $R_8$ and $R_9$ are | members selected from the group consisting of hydrogen, lower alkyl, lower |

2. The polyester of claim 1 wherein said compound is of the formula:

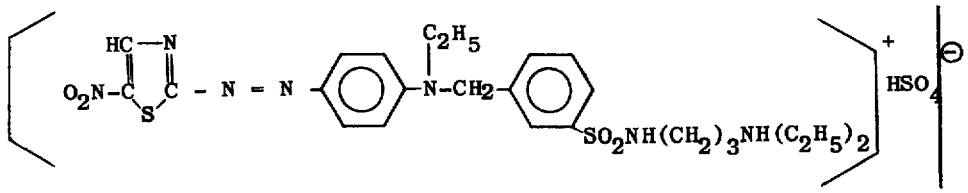

3. The polyester of claim 1 wherein said compound is of the formula:

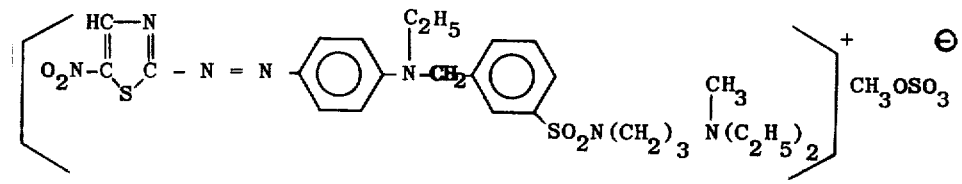

4. The polyester of claim 1 wherein said compound is of the formula:

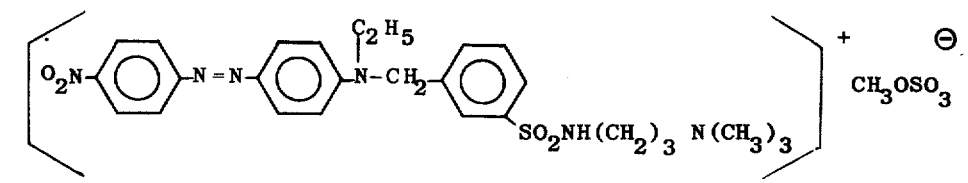

5. The polyester of claim 1 wherein said compound is of the formula:

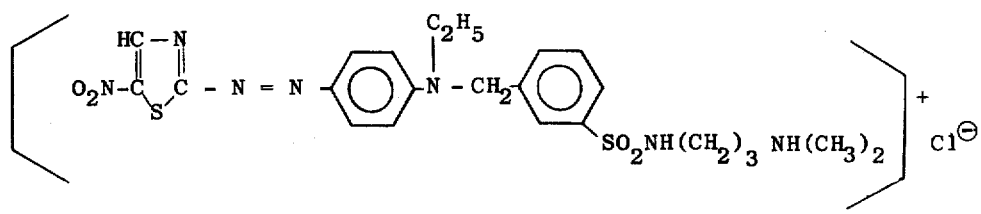

6. The polyester of claim 1 wherein said compound is of the formula:

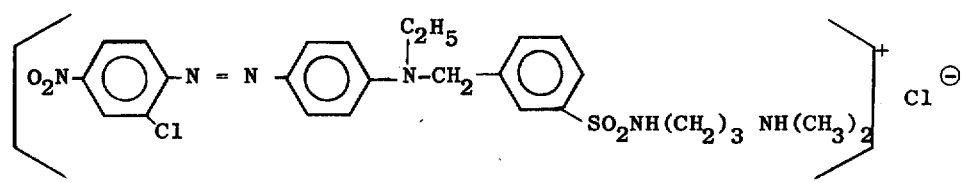

7. The polyester of claim 1 wherein said compound is of the formula:

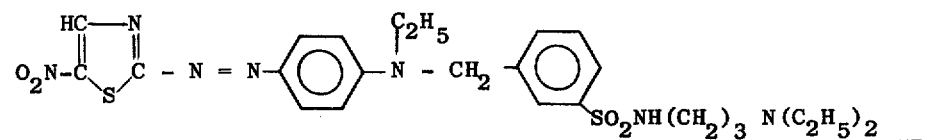

8. A polyacrylonitrile textile material dyed with a compound of the formula:

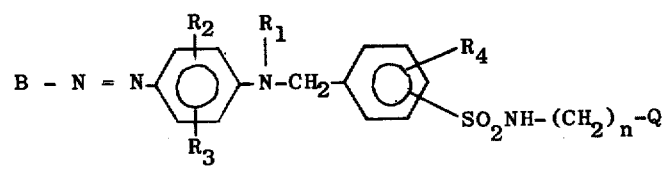

in which:

B is a member selected from the group consisting of

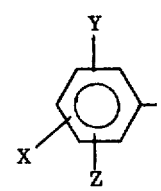 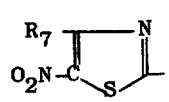 and 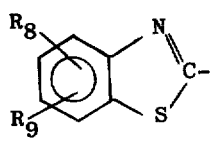

wherein

X, Y, and Z are members selected from the group consisting of hydrogen, nitro, chlorine, bromine, lower alkoxy, lower alkyl, cyano, sulfamyl, N-(lower alkyl)-sulfamyl, N,N-(dilower alkyl)-sulfamyl, lower acylamido, trifluoromethyl, lower alkyl sulfonyl, carbamyl, N-(lower alkyl)carbamyl and N,N-(dilower alkyl) carbamyl; hydrogen or methyl; and hydrogen or methyl; and $R_7$ is $R_8$ and $R_9$ are members selected from the group consisting of hydrogen, lower alkyl, lower alkoxy, chlorine, bromine, nitro, sulfamyl, N,N-(dilower alkyl)sulfamyl, cyano, and lower alkyl sulfonyl;

$R_1$ is lower alkyl, cyano lower alkyl, and hydroxy lower alkyl;

$R_2$, $R_3$ and $R_4$ are hydrogen, lower alkyl, lower alkoxy, chlorine and bromine;

n is an integer having a value of 2–4;

Q is a member selected from the group consisting of

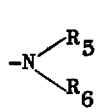 and 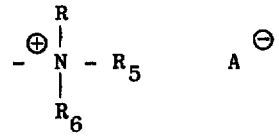

| | -Continued |
|---|---|
| $R_3$ and $R_4$ are | methyl or ethyl; |
| R is | hydrogen, methyl, or ethyl; and |
| $A^{\ominus}$ is | a water soluble anion. |

9. The polyacrylonitrile of claim 8 wherein said compound is of the formula:

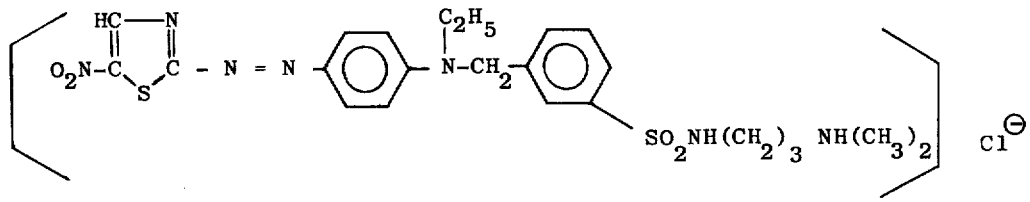

10. The polyacrylonitrile of claim 8 wherein said compound is of the formula:

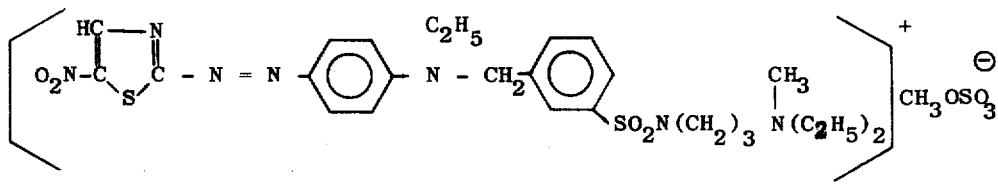

11. The polyacrylonitrile of claim 8 wherein said compound is of the formula:

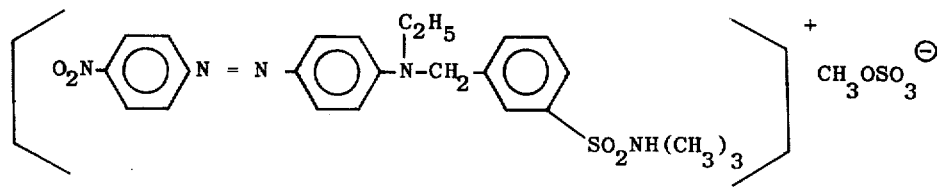

12. The polyacrylonitrile of claim 8 wherein said compound is of the formula:

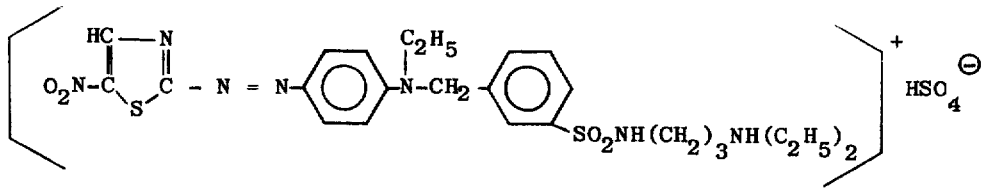

13. The polyacrylonitrile of claim 8 wherein said compound is of the formula:

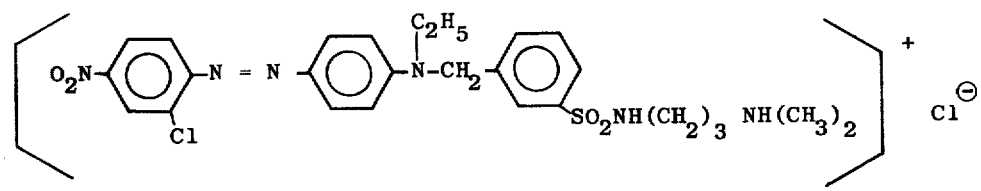

14. The polyacrylonitrile of claim 8 wherein said compound is of the formula:

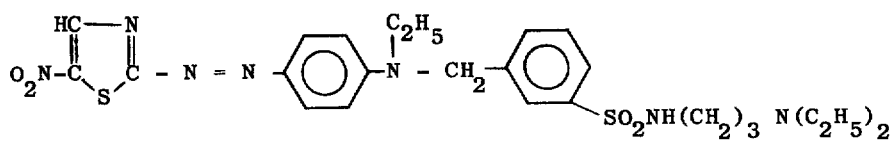

* * * * *